United States Patent
Sokomba et al.

(10) Patent No.: US 11,620,140 B2
(45) Date of Patent: Apr. 4, 2023

(54) CONFIGURABLE USER INTERFACE ARCHITECTURE

(71) Applicant: GE AVIATION SYSTEMS LLC, Grand Rapids, MI (US)

(72) Inventors: Paul Tama Sokomba, Byron Center, MI (US); James Creighton Zandee, Grand Rapids, MI (US); David Allen Fairchild, Alto, MI (US); Joseph Mark Downey, Kentwood, MI (US); Timothy Jay Lindgren, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 16/576,243

(22) Filed: Sep. 19, 2019

(65) Prior Publication Data

US 2020/0110621 A1   Apr. 9, 2020

Related U.S. Application Data

(60) Provisional application No. 62/741,304, filed on Oct. 4, 2018.

(51) Int. Cl.
*G06F 9/451* (2018.01)
*G09G 5/36* (2006.01)
(Continued)

(52) U.S. Cl.
CPC .............. *G06F 9/451* (2018.02); *B64D 43/00* (2013.01); *G01C 23/00* (2013.01); *G09G 5/36* (2013.01);
(Continued)

(58) Field of Classification Search
CPC ......... G06F 9/451; B64D 43/00; G01C 23/00; G09G 5/36; G09G 2354/00; G09G 2380/12
(Continued)

(56) References Cited

U.S. PATENT DOCUMENTS

| | | | |
|---|---|---|---|
| 9,980,298 B2 | 5/2018 | Batsakes et al. | |
| 10,135,927 B1* | 11/2018 | Barber | H04L 67/12 |
| 2005/0091036 A1* | 4/2005 | Shackleton | G06F 40/205 |
| | | | 704/9 |
| 2014/0063037 A1* | 3/2014 | Danielsson | G01C 23/00 |
| | | | 345/581 |

(Continued)

FOREIGN PATENT DOCUMENTS

| | | |
|---|---|---|
| CN | 102520899 A | 6/2012 |
| CN | 107128498 A | 9/2017 |

(Continued)

OTHER PUBLICATIONS

Wikipedia, "Data Mapping", web page: http://en.wikipedia.org/w/index.php?title=Data_mapping&oldid=261914241, Jan. 4, 2009, 3 pages.

(Continued)

*Primary Examiner* — Tadesse Hailu
*Assistant Examiner* — Darrin Hope
(74) *Attorney, Agent, or Firm* — McGarry Bair PC (57) ABSTRACT

A configurable user interface architecture to be used in high integrity safety critical avionic systems and is adaptable to multiple cockpit displays has a protocol-agnostic layer that handles entry and display update behaviors, and a protocol-specific layer that connects the entry and display behaviors to protocol-specific input/output messages using configuration tables. The configuration tables are built using a specially designed configuration tool and the configuration table built by the tool can be embedded in the target user interface software or loaded externally into a pre-compiled application.

17 Claims, 5 Drawing Sheets

(51) Int. Cl.
    *B64D 43/00*    (2006.01)
    *G01C 23/00*    (2006.01)
(52) U.S. Cl.
    CPC ..... *G09G 2354/00* (2013.01); *G09G 2380/12* (2013.01)
(58) Field of Classification Search
    USPC ........................................................ 715/762
    See application file for complete search history.

(56)                    References Cited

U.S. PATENT DOCUMENTS

2018/0115609 A1*    4/2018  Dusik ..................... H04L 67/12
2018/0373404 A1*   12/2018  Sivaratri ............... G06F 3/0484

FOREIGN PATENT DOCUMENTS

EP          3136318 A1      3/2017
EP          3252597 A1     12/2017
FR          3017763 B1      6/2017

OTHER PUBLICATIONS

Gamma E. et al., "Design Patterns, Passage", Published Jan. 1, 1995, 12 pages.
Eric Barboni et al., "A Formal Description Technique for Interactive Cockpit Applications Compliant with ARINC Specification 661", May 20, 2007, 8 pages, published in 2007 International Symposium on Industrial Embedded Systems, France.

\* cited by examiner

CONFIGURABLE USER INTERFACE ARCHITECTURE

CROSS REFERENCE TO RELATED APPLICATION(S)

This application claims priority to and benefit of U.S. Provisional Patent Application No. 62/741,304 filed Oct. 4, 2018, which is incorporated herein in its entirety.

TECHNICAL FIELD

The disclosure relates to a method and architecture for bidirectionally mapping formatted and unformatted data, independent of the respective formatted and unformatted constraints.

BACKGROUND OF THE INVENTION

Traditional user interface designs suffer from high cost of change and typically the design process starts over for every new product. This is due to the variation that is expected with user interfaces because every customer wants the ability to make changes. As well, many known application development kits include run-time dynamically allocated memory paradigms to "configure" a user interface at run-time, however this approach does not work with safety critical real-time embedded applications. The application development kits typically have strategies that are not predictive and complete documentation of these kits is not to the level that is required for a safety critical application.

The certification effort for safety critical airborne software is an expensive exercise so cost-effective ways that manage variability within the user interface space are needed. Reducing this effort (cost and schedule) from an OEM standpoint will allow more time spent on improving the usability of the system, which ultimately leads to a safer user interface design.

BRIEF DESCRIPTION

In one aspect, the present disclosure relates to an architecture for an interface display, including a protocol-agnostic interface layer configured to define unformatted system data, a protocol-specific interface layer communicatively coupled with the protocol-agnostic interface layer, and defining display behaviors of the interface display, and a mapping table defining formatting definitions for bidirectional mapping of the unformatted system data with the interface display, wherein the bidirectional mapping of the unformatted system data with the interface display enables displaying of formatted system data based on mapping the unformatted system data, by way of the mapping table defining translating the unformatted system data between the protocol-agnostic interface layer and the protocol-specific interface layer, such that the formatted system data is displayed in accordance with the display behaviors of the interface display, and wherein the bidirectional mapping of the unformatted system data with the interface display enables receiving a formatted protocol-specific interface layer input data at the interface display, and mapping the formatted input data to unformatted system input data, by way of the mapping table defining translating the formatted input data between the protocol-specific interface layer and the protocol-agnostic interface layer, such that the architecture can perform a system action based on the unformatted system data input.

In another aspect, the present disclosure relates to a method of operating an interface display for an aircraft, the method including retrieving, by a system operating a protocol-specific interface layer, a user input on the interface display, mapping, by way of a mapping table defining formatting definitions of the interface display, the user input to corresponding unformatted system input data, communicating the unformatted system input data to an avionics system by way of a protocol-agnostic interface layer, and in response to the communicating, performing a system action, by the avionics system, including the unformatted system input data.

DESCRIPTION OF ASPECTS OF THE DISCLOSURE

The described aspects of the present disclosure are directed to a user interface architecture, for example, in an aircraft. While an aircraft is specifically mentioned, the user interface architecture can be utilized in any user interface where adaptability between distinct installations is advantageous and especially when safety critical certifications are important.

Aspects of the disclosure can be implemented in any environment, apparatus, system, or method having a regulated, restricted, authorized, or otherwise limited "write-access" privileges to a memory or data store component. As used herein, "write-access" means availability or authorization to commit a change to a memory, the change being storing or overwriting data, values, commands, instructions, or any other data, element, or identifier to a memory location, regardless of the function performed by the data, element, or identifier, or regardless of the function or implementation of the environment, apparatus, system, or method. Collectively, "access" to data or "accessing" data can refer to either reading, viewing, or otherwise receiving data from a data store, "writing" data, as referenced above, or a combination thereof. As used herein, a "regulated" system is a system having restrictions on access, such as write-access to data or values of the system, whereby only approved or authorized entities, parties, functions, or the like, are enabled or otherwise allowed to access the regulated or restricted elements. In one non-limiting example, only a single authorized function can have write access to a specific data element.

While "a set of" various elements will be described, it will be understood that "a set" can include any number of the respective elements, including only one element. Also as used herein, while elements or components can be described as "sensing" or "measuring" a respective value, data, function, or the like, sensing or measuring can include determining a value indicative of or related to the respective value, data, function, or the like, rather than directly sensing or measuring the value, data, function, or the like, itself. The sensed or measured value, data, function, or the like, can further be provided to additional components. For instance, the value can be provided to a controller module or processor, and the controller module or processor can perform processing on the value to determine a representative value or an electrical characteristic representative of said value, data, function, or the like.

As used herein, a "data store" can include a data value stored in a memory, wherein the data value is only write-accessible by a single function, program, entity, or the like (a "writer"). The write-accessibility of the data store can be policed or otherwise regulated by digital security mechanisms understood by those skilled in the art. While only a single writer has write-access to the data store, a data store can have or include multiple function, program, or entities having read-access to read, view, or otherwise receive the data in an unidirectional relationship. In contrast with the data store, a "data store queue" can include a data value or set of data values stored in a memory, wherein the data value is write-accessible by a set of one or more functions, programs, entities, or the like. The write-accessibility of the data store queue can be policed or otherwise regulated by digital security mechanisms understood by those skilled in the art. Additionally, a data store queue can include only a single function, program, or entity having read-access to read, view, or otherwise receive the data in a unidirectional relationship.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein.

The exemplary drawings are for purposes of illustration only and the dimensions, positions, order and relative sizes reflected in the drawings attached hereto can vary.

This disclosure is directed to user interface architecture that provides reusability and rapid deployment of user interface changes in a way that is within the requirements of a safety critical system, such as an avionics system for an aircraft. The components of the architecture are standalone and can be independently verified at a unit level or at an integrated level with equivalent results. This also means each component in the architecture has complete certification artifacts that are independent of each other.

Figure 1:
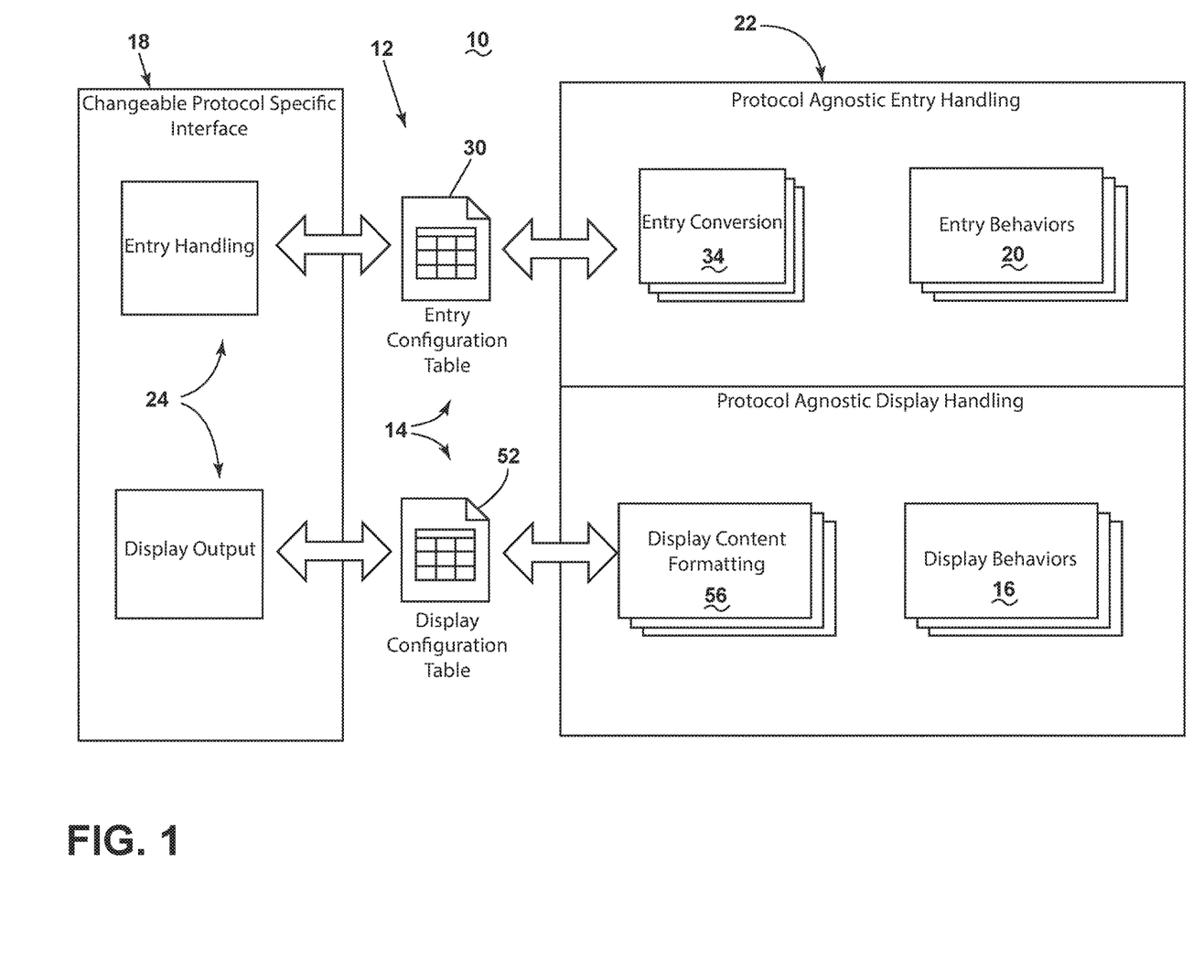
FIG. 1 illustrates schematically an interaction between a protocol-agnostic layer and a protocol-specific layer in accordance with various aspects described herein.

FIG. 1 illustrates the architecture 10 having an efficient "protocol-agnostic" language to connect the user interface behaviors 24 to protocol-specific messages generated by or sent to the cockpit display system. The connection 12 occurs using table configuration parameters 14 that describe all that is necessary to process user input from the display system, and display behaviors 16 that convey the internal state of the system back to the user. This allows the protocol-specific cockpit display system 18 interface to be changed without needing to modify or adapt any of the entry or display behaviors 20, 16 to the new protocol. All the protocol-specific translation is handled in the protocol-specific layer 18.

Using this pattern allows the target user interface software to have the potential of driving multiple cockpit architectures from the same core software. In addition, the protocol-specific layer 18 is verified independently from the protocol-agnostic layer 22 (core user interface behaviors) reducing the time and effort to deploy a new user interface into a new cockpit display architecture.

Figure 2:
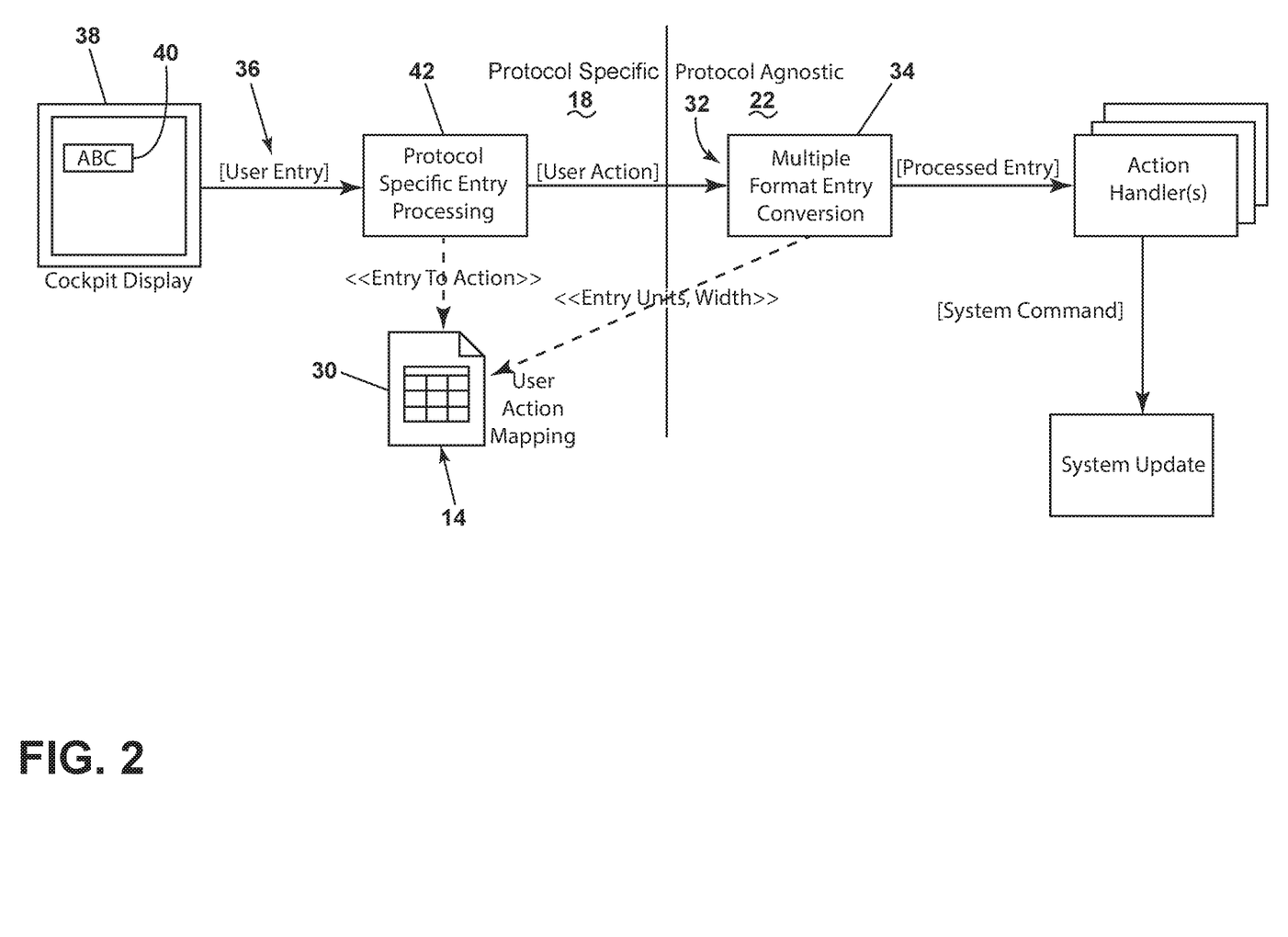
FIG. 2 illustrates entry handling from the protocol-specific layer in the protocol-agnostic layer of FIG. 1, in accordance with various aspects described herein.

In FIG. 2, the protocol-specific layer 18 uses the configuration tables 14 to identify what protocol-agnostic message to send to the protocol-agnostic layer 22. An exemplary configuration table 14 is the User Action Mapping table 30 in FIG. 2.

After receiving the protocol-agnostic translation 32 from the protocol-specific layer 18, the protocol-agnostic layer 22 uses the unit that is configured in the configuration tables 14 for the specific user input field to perform entry conversion 34 of the user input 36 to that unit (such as speed, altitude, distance, direction, frequency). This also means that entry errors are all generated by the protocol-agnostic layer 22. The entry processing 42 can handle multiple formats for the entries 36 in order to support any constraints of the cockpit display system 38. It can handle situations where one entry 36 can have multiple units (for example "Speed/Altitude" entry of "250/FL180"). The configuration also allows for specifying parts or whole of a combined entry field 40 (as in the example above "/FL180" will accept the altitude portion only).

Figure 3:
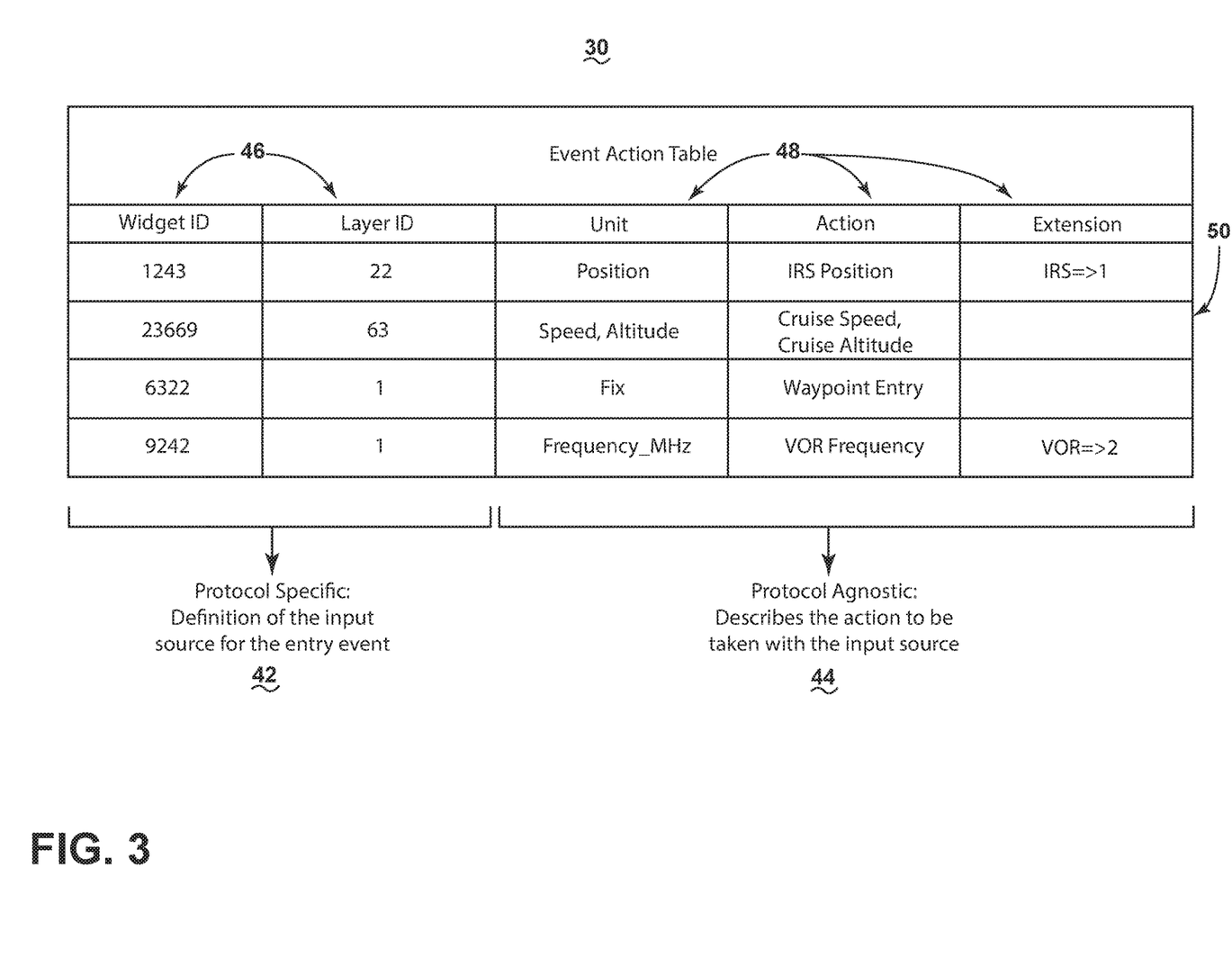
FIG. 3 illustrates a user action mapping table of FIG. 2.

In FIG. 3, the exemplary User Action Mapping table 30 implements the binding of the external inputs 42 to the protocol-agnostic actions 44. The left two columns 46 of the table are considered the "input source identification" columns. The example is shown for an ARINC 661 cockpit display system, but this can be adapted to any other user interface. The three columns on the right (Unit, Action, Extension) 48 are used to build the protocol-agnostic description of the input so that it can be handled by the protocol-agnostic layer 44.

The "Unit" column describes the expected source units for the entry. The second row 50 of the table 30 has two units entered in because the input field is expected to allow both speed and altitude to be entered with a known separator to indicate which of the values the user has entered. For example, a "240" or "240/" will be understood as the speed entry and "/FL340" will be understood as the altitude entry just by the position of the slash.

The "Action" describes an action that is expected to be performed when input is received from the source. Like the "Unit" column, there can be multiple actions to match the number of units specified. The Action is least likely to change and together with the entry conversion, represents a significant portion of the components needed for entry handling.

The "Extension" provides additional configuration that will help in the translation of the input to the right system update action.

Figure 4:
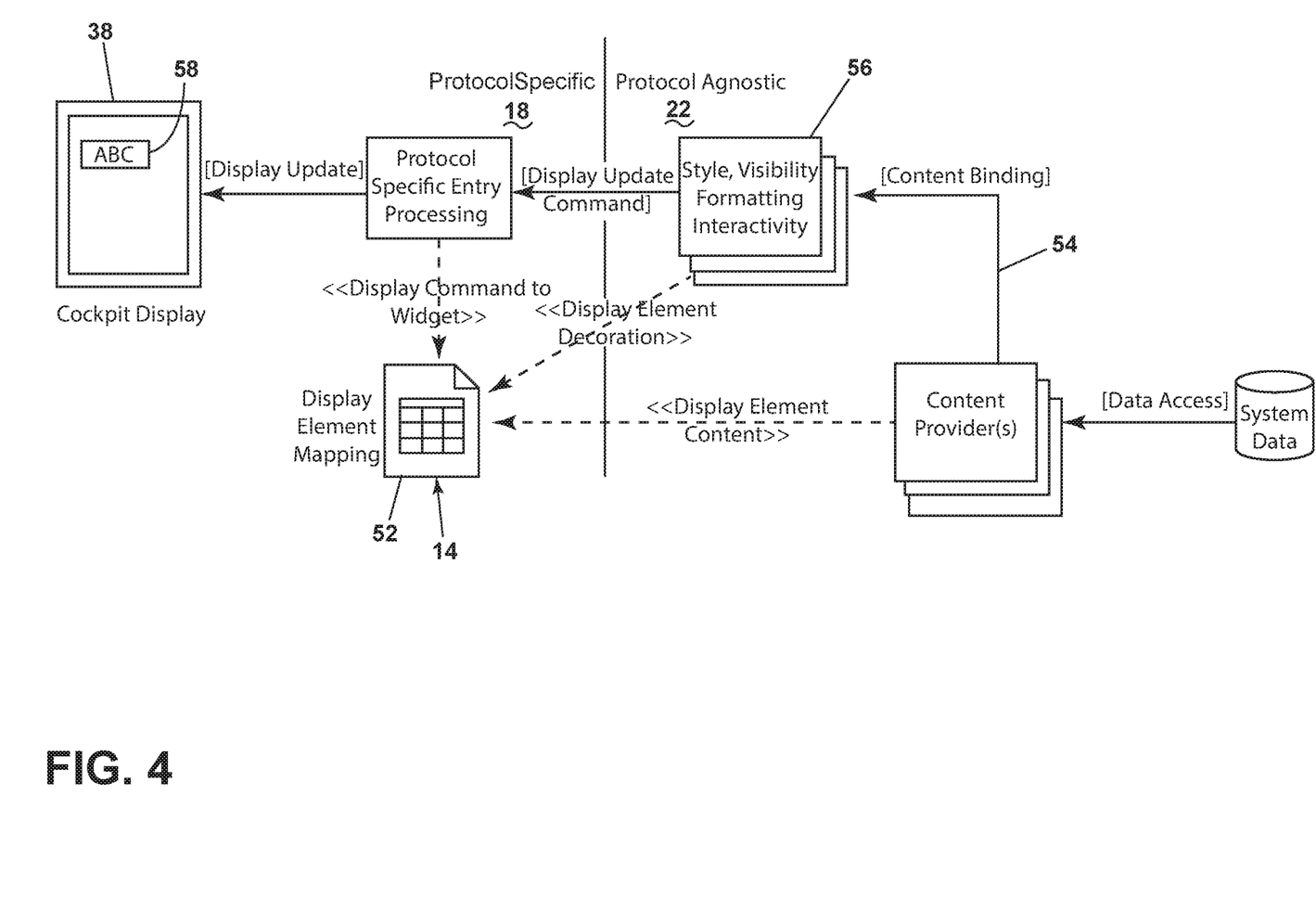
FIG. 4 illustrates display output in the protocol-specific layer from the protocol-agnostic layer of FIG. 1, in accordance with various aspects described herein.

In FIG. 4, the protocol-specific layer 18 uses the configuration tables 14 to understand how to translate a protocol-agnostic 22 message to the protocol-specific display system 18. An exemplary configuration table is the Display Mapping Element table 52 in FIG. 4.

The display behaviors 16 bind content from internal state 54 of the target user interface application and apply decoration (style, formatting, visibility, and interactivity) 56 to the output. Like the entry processing 42, the content is represented in displayable units (speed, altitude, frequency, etc.). Again, to support any constraints of the cockpit display 38, a display item 58 can be configured to display as a single or combined unit content field (such as "Speed/Altitude") simply by the configuration.

The decoration (style, format, visibility, and interactivity) that is applied to a display item 58 is also specified by configuration table 14. A configuration tool is used to create the configuration tables 14 and ensures that the correct decoration is applied to a content (for example, a speed formatter is not applied to an altitude content).

The entry and display behaviors 20, 16 are designed such that the verification of the behavior can be conducted at a unit level or at an integrated level and have equivalent results. Because of this, the configuration tables 14 only need to be verified for correctness by the configuration tool, but the target user interface software would not need any further verification due to a change in the configuration.

To alleviate some of the certification concerns for an embedded system, dynamic memory allocation is only used when initializing the table from a parameter data item (PDI). The loading mechanism always ensures that the size of the file will not exceed the maximum allowed memory allocation that has been reserved for the user interface of the target system. In addition, the configuration tool builds a hash into the configuration tables that the target software will use to ensure that the options in the configuration are compatible with the target software.

Figure 5:
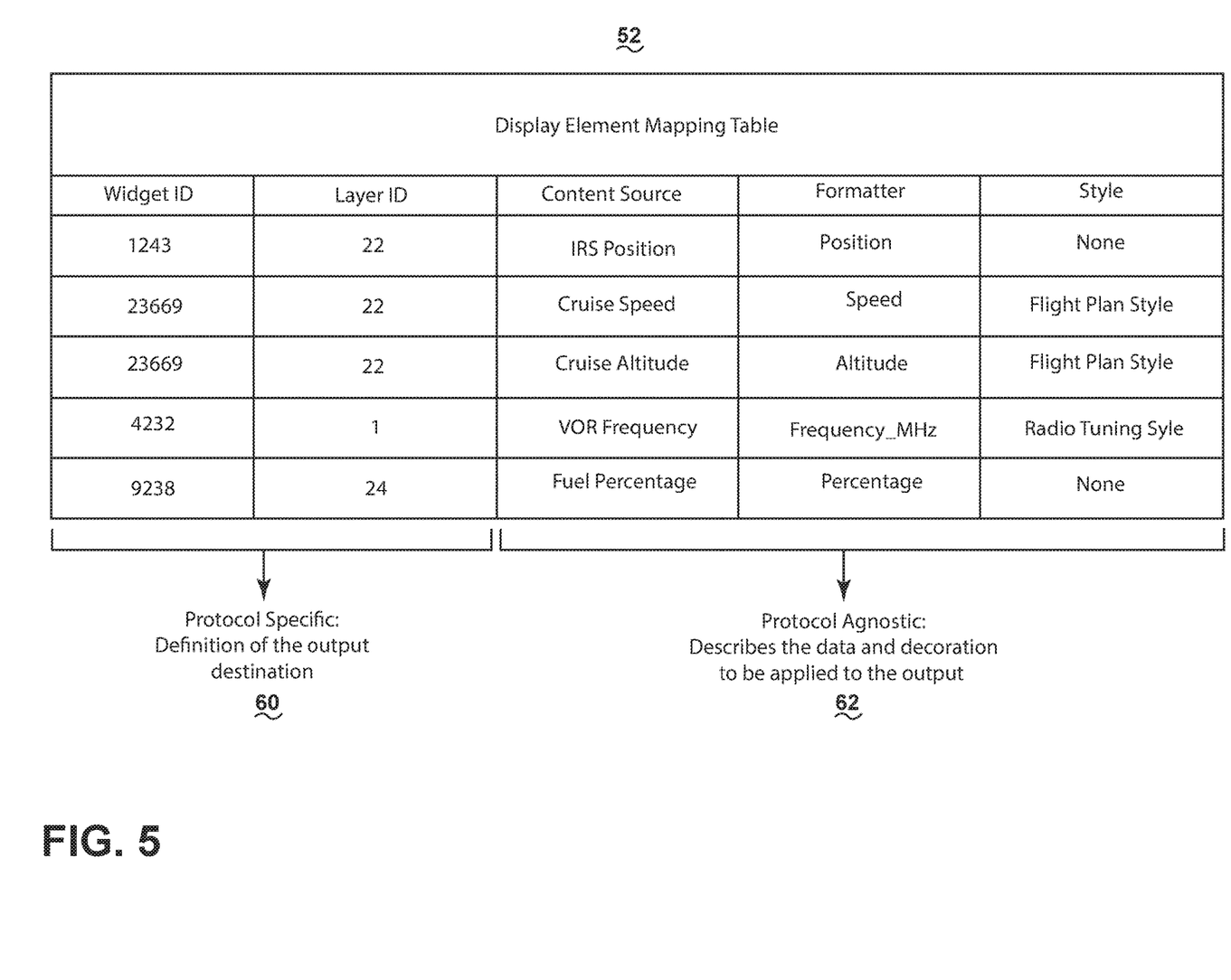
FIG. 5 illustrates a display element mapping table of FIG. 4

FIG. 5 illustrates how a Display Element Mapping 52 can be implemented. The left side 60 of the table 52 is the protocol-specific mapping to a user interface element (in this case a widget). Again, the example shown here is for an ARINC 661 cockpit display system 38 but can be adapted to any cockpit display architecture. The "Formatter" and "Style" can be varied for different applications to suite the user interface requirement needs. Not shown is any additional columns that might be needed by the protocol-specific layer to further serialize the display update commands that come from the protocol-agnostic layer 62. The "Content Source" reads the source information and provides attributes that a formatter and style routine can use to further decorate the displayed item 58. The Content Source is least likely to change but represents a significant portion of the user interface logic.

Many other possible aspects and configurations in addition to that shown in the above figures are contemplated by the present disclosure.

Technical effects of the disclosure configurable user interface architecture include rapidly adapting a user interface core to different cockpit architectures without having to rewrite the entire user interface code base. As well, it provides a low cost of change for updates to the user interface due to the flexibility provided in the configuration tables. A user interface system in accordance with various aspects described herein can support a product line approach in a safe way and DO-178C certifiable way. The software is easier to understand and maintain due to a repeatable pattern for implementing the software; the elements are developed in a predictable way and the infrastructure is very light weight, which gives more confidence on the integrity of the user interface software. Further, a user interface is field reconfigurable since the user interface software behavior is not being modified. Only the application of the behavior is being adapted. The configuration tools provide the assurance that the configuration to be loaded is correct and compatible with the software. This will allow OEMs to make minor changes to the display at a much lower cost.

To the extent not already described, the different features and structures of the various aspects can be used in combination with each other as desired. That one feature is not illustrated in all of the aspects is not meant to be construed that it is not included, but is done for brevity of description. Thus, the various features of the different aspects can be mixed and matched as desired to form new aspects of the disclosure, whether or not the new aspects are expressly described. All combinations or permutations of features described herein are covered by this disclosure.

This written description uses examples to disclose aspects of the disclosure, including the best mode, and also to enable any person skilled in the art to practice the aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An architecture for an interface display, including a protocol-agnostic interface layer configured to define unformatted system data, a protocol-specific interface layer communicatively coupled with the protocol-agnostic interface layer, and defining display behaviors of the interface display, and a mapping table defining formatting definitions for bidirectional mapping of the unformatted system data with the interface display, wherein the bidirectional mapping of the unformatted system data with the interface display enables displaying of formatted system data based on mapping the unformatted system data, by way of the mapping table defining translating the unformatted system data between the protocol-agnostic interface layer and the protocol-specific interface layer, such that the formatted system data is display in accordance with the display behaviors of the interface display, and wherein the bidirectional mapping of the unformatted system data with the interface display enables receiving a formatted protocol-specific interface layer input data at the interface display, and mapping the formatted input data to unformatted system input data, by way of the mapping table defining translating the formatted input data between the protocol-specific interface layer and the protocol-agnostic interface layer, such that the architecture can perform a system action based on the unformatted system data input.

2. The architecture of any preceding clause wherein the interface display is an avionics interface display.

3. The architecture of any preceding clause wherein the interface display is a cockpit interface display.

4. The architecture of any preceding clause wherein the display behaviors define how to format display data for the interface display.

5. The architecture of any preceding clause, further comprising a set of interface displays, and wherein the bidirectional mapping enables mapping between the protocol-agnostic interface layer and the protocol-specific interface layer by way of the mapping table defining formatting definitions for each of the set of interface displays.

6. The architecture of any preceding clause wherein the set of interface displays includes at least two different interface displays.

7. The architecture of any preceding clause wherein the protocol-specific layer is verified for avionics use independently from the protocol-agnostic interface layer.

8. The architecture of any preceding clause wherein the display behaviors define the constraints of the interface display.

9. The architecture of any preceding clause wherein the interface display is an ARINC 661 cockpit display system.

10. The architecture of any preceding clause wherein the formatted protocol-specific interface layer input data is a user input, and the system action includes an avionics system action that is performed in response to the user input received at the interface display.

11. The architecture of any preceding clause wherein the mapping table defines decoration of the formatted data on the interface display.

12. A method of operating an interface display for an aircraft, the method including retrieving, by a system operating a protocol-specific interface layer, a user input on the interface display, mapping, by way of a mapping table defining formatting definitions of the interface display, the user input to corresponding unformatted system input data, communicating the unformatted system input data to an avionics system by way of a protocol-agnostic interface layer, and in response to the communicating, performing a system action, by the avionics system, including the unformatted system input data.

13. The method of any preceding clause, further including retrieving, by the protocol-agnostic interface layer, unformatted stored data, mapping, by way of the mapping table, the unformatted stored data to formatted stored data, communicating the formatted stored data from the protocol-agnostic interface layer to the protocol-specific interface layer, and displaying the formatted stored data at the interface display in accordance with the formatting definitions of the interface display.

14. The method of any preceding clause wherein the formatting definitions include display behaviors defining decoration related to how to format unformatted stored data for the interface display.

15. The method of any preceding clause wherein the formatting definitions define the constraints of the interface display.

16. The method of any preceding clause, further comprising mapping the unformatting stored data to a set of formatted stored data for a corresponding set of different interface displays.

17. The method of any preceding clause, further comprising communicating the set of formatted stored data from the protocol-agnostic interface layer to the protocol-specific interface layer at the respective set of different interface displays, and displaying the set of formatted stored data at the respective interface display in accordance with the formatting definitions of the respective interface display, wherein the formatting definitions for each of at least two of the set of interface displays is different.

18. The method of any preceding clause wherein the mapping is bidirectional mapping between the protocol-specific interface layer and the protocol-agnostic interface layer.

19. The method of any preceding clause wherein the interface display is a cockpit interface display.

20. The method of any preceding clause, further comprising verifying the protocol-specific layer for avionics use independently from the protocol-agnostic interface layer.

What is claimed is:

1. An architecture for an interface display, comprising:
   at least two interface displays;
   a protocol-agnostic interface layer configured to define unformatted system data;
   at least two protocol-specific interface layers respectively defining display behaviors of the at least two interface displays; and
   a mapping table defining formatting definitions for bidirectional mapping of the unformatted system data for each of the at least two interface displays;
   wherein the bidirectional mapping of the unformatted system data with a respective interface display enables displaying of formatted system data based on mapping the unformatted system data, by way of the mapping table defining translating the unformatted system data between the protocol-agnostic interface layer and one of the at least two protocol-specific interface layers, without adapting the display behaviors of the respective interface display, such that the formatted system data is displayed in accordance with the display behaviors of the respective interface display;
   wherein the bidirectional mapping of the unformatted system data with the respective interface display enables receiving a formatted protocol-specific interface layer input data at the respective interface display, and mapping the formatted input data to unformatted system input data, by way of the mapping table defining translating the formatted input data between the one of the at least two protocol-specific interface layers and the protocol-agnostic interface layer, without adapting the display behaviors of the respective interface display, such that the architecture can perform a system action based on the unformatted system data input; and
   wherein the at least two interface displays are an ARINC 661 cockpit display system.

2. The architecture of claim 1 wherein the at least two interface displays are avionics interface displays.

3. The architecture of claim 2 wherein the at least two interface displays are cockpit interface displays.

4. The architecture of claim 1 wherein the display behaviors define how to format display data for the respective interface display.

5. The architecture of claim 1 wherein the protocol-specific layer is verified for avionics use independently from the protocol-agnostic interface layer.

6. The architecture of claim 1 wherein the display behaviors define constraints of the at least two interface displays.

7. The architecture of claim 1 wherein the formatted protocol-specific interface layer input data is a user input, and the system action includes an avionics system action that is performed in response to the user input received at one of the at least two interface displays.

8. The architecture of claim 1 wherein the mapping table defines decoration of the formatted data on the at least two interface displays.

9. A method of operating at least two different interface displays for an aircraft, the method comprising:
   receiving a user input via at least one of the at least two different interface displays;
   providing the user input to a mapping table without modifying an entry behavior of the at least one interface display in an avionics system operating at least two different protocol-specific interface layers defining display behaviors of the at least two different interface displays, wherein the mapping table defines formatting definitions for each of the at least two different interface displays;
   mapping, by way of the mapping table, the user input to corresponding unformatted system input data;
   communicating the unformatted system input data to a memory of the avionics system by way of a protocol-agnostic interface layer without modifying the entry behavior of the at least one interface display; and in response to the communicating, performing a system action, by the avionics system, including the unformatted system input data.

10. The method of claim 9, further comprising:

retrieving, by the protocol-agnostic interface layer, the unformatted system input data from the memory;

mapping, by way of the mapping table, the unformatted system input data to formatted stored data;

communicating the formatted stored data from the protocol-agnostic interface layer to at least one of the protocol-specific interface layers associated with at least one of the two different interface displays without adapting the entry behavior of the at least one interface display; and displaying the formatted stored data at the at least one of the two different interface displays in accordance with the formatting definitions of the respective one of the two different interface displays.

11. The method of claim 10 wherein the formatting definitions include display behaviors defining decoration related to how to format unformatted stored data for the at least two different interface displays.

12. The method of claim 11 wherein the formatting definitions define constraints of the at least two different interface displays.

13. The method of claim 10, further comprising mapping the unformatted system input data to a set of formatted stored data for each of the at least two different interface displays.

14. The method of claim 9 wherein the mapping is bidirectional mapping between each of the at least two different protocol-specific interface layers and the protocol-agnostic interface layer.

15. The method of claim 9 wherein the at least two different interface displays are cockpit interface displays.

16. The method of claim 9, further comprising verifying each of the at least two different protocol-specific interface layers for avionics use independently from the protocol-agnostic interface layer.

17. The method of claim 9, wherein the at least one of the two different interface displays are an ARINC 661 cockpit display system.

* * * * *